(12) United States Patent
Selcer et al.

(10) Patent No.: US 6,783,593 B2
(45) Date of Patent: Aug. 31, 2004

(54) ROTARY CABLE TREATMENT METHOD AND APPARATUS

(75) Inventors: Toby Selcer, College Station, TX (US); David Janac, Caldwell, TX (US); James Stasny, College Station, TX (US)

(73) Assignee: Dynacon, Inc., Bryan, TX (US)

( * ) Notice: Subject to any disclaimer, the term of this patent is extended or adjusted under 35 U.S.C. 154(b) by 0 days.

(21) Appl. No.: 09/825,660

(22) Filed: Apr. 3, 2001

(65) Prior Publication Data

US 2002/0139616 A1 Oct. 3, 2002

(51) Int. Cl.⁷ .................................................. B05C 3/12
(52) U.S. Cl. ...................................... 118/125; 118/420
(58) Field of Search ..................... 184/15.2; 15/256.6; 134/199; 425/113; 118/410, 125, 420

(56) References Cited

U.S. PATENT DOCUMENTS

| | | |
|---|---|---|
| 2,370,314 A | 2/1945 | Jenner |
| 3,951,235 A | 4/1976 | Acerbi |
| 4,063,617 A | 12/1977 | Shenk |
| 4,169,427 A | 10/1979 | Crump et al. |
| 4,336,866 A | 6/1982 | Blanton, Jr. |
| 4,422,529 A | 12/1983 | Johansen |
| 4,498,558 A | 2/1985 | Bendahan |
| 4,749,059 A | 6/1988 | Jonnes et al. |
| 4,862,996 A | 9/1989 | Chisholm |
| 5,107,961 A | 4/1992 | Schott et al. |
| 5,333,704 A | 8/1994 | Hoff |

FOREIGN PATENT DOCUMENTS

| | | |
|---|---|---|
| GB | 790551 | 2/1958 |
| GB | 2 158 114 | 11/1985 |

*Primary Examiner*—Brenda A. Lamb
(74) *Attorney, Agent, or Firm*—McHale & Slavin, P.A.

(57) ABSTRACT

A rotary cable treatment assembly for use on cables having a non-circular cross section formed from a stator that housing a rotor formed from two hydraulically sealing bearings. A cable having a non-circular cross section is passed through the assembly wherein a lubricant or high viscosity inhibitor is pressurized to about 3000 psi within the assembly causing the fluid to coat all internal strands that form the cable. The rotor and hydraulically sealing bearings rotate according to the helix of the cable to reduce or eliminate wear on the cable and sealing.

20 Claims, 2 Drawing Sheets

ROTARY CABLE TREATMENT METHOD AND APPARATUS

FIELD OF THE INVENTION

This invention is related to the cable treatments and in particular, to a method and apparatus for treating non-circular cables with a lubricant or rust inhibitor at high pressure.

BACKGROUND OF THE INVENTION

Cables used in marine and land based applications are bundles of organized metal wires that provide strength in tensile loading applications. These cables are used on many applications seen every day just driving down the highway. Cranes used to lift cargo, draglines used in digging, suspension bridges, guy wires on antenna systems and building elevators are a few land based examples.

These examples also pertain to use offshore with the addition of mooring cables used to anchor floating systems to the ocean floor and umbilical systems used to tow underwater scientific packages behind ships. There are many other applications, but this list demonstrates the broad range of cable usage in the world today.

All of these cables are subject to corrosion with time. In offshore applications, this time is greatly reduced due to the salt water's ability to corrode metals at an accelerated rate. There are several techniques currently used to fight the corrosion problems of both land based and marine applications. One such technique is the use of galvanized cable. The benefit of using galvanized cable is that the galvanizing material, molten zinc, is applied to the individual wires during the manufacture of the cable, resulting in a relatively minor cost impact. The galvanic coating process results in a relatively maintenance free cable, cable life is substantially extended, and the coating is relatively inexpensive. The negative aspects of the galvanic process are a reduction in the cable capacity for a given diameter of wire as the high strength wire has to be processed at a reduced diameter to allow for the additional zinc build-up during galvanizing (the change in diameter is squared in stress calculations, resulting in a significant impact on ultimate cable strength), cable system diameter must increase for the same load rating resulting in increase in all components the cable rolls across and is stored on, yielding a concomitant increase in overall system weight.

Thus, the relatively inexpensive galvanizing ultimately results in a significant cost increase to the total system, in salt water applications, break down of the zinc occurs fairly rapidly, and once the galvanizing is consumed by the salt water the cable must be replaced fairly quickly.

An alternative technique is the application of manually applied rust inhibitors. Use of rust inhibiting materials protects non-galvanized as well as galvanized cables, extends the life of galvanized and non-galvanized cables, can be reapplied as needed, and can be applied for the first time during the manufacturing of the cable. Detriments inherent in the use of such materials is that their application is messy, uniform application is extremely difficult, getting the inhibitor to penetrate to the core of the cable is very difficult with the high viscosity styles of inhibitors, service life is short with the brush-on low viscosity styles of inhibitors, and saltwater washes out the inhibitor with time.

DESCRIPTION OF THE PRIOR ART

U.S. Pat. No. 4,862,996 discloses a process wherein a liquid is applied to a wire rope by passing the rope through an elongated casing in which liquid is sprayed against the rope, excess liquid being discharged through annular grooves containing discharge openings upstream and downstream of the liquid inlet. Air is blown against the rope upstream and downstream of the annular grooves and discharge openings for causing the liquid to be discharged through such openings and not through the ends of the casing.

U.S. Pat. No. 5,333,704 discloses a device wherein a lubricant is applied to a lubrication point by moving an emitter in a first portion of a movement path through lubricant in a reservoir and then moving the emitter through a second portion of the movement path. The emitter is loaded with lubricant in the first portion of the movement path and is drained from a drain port during the second portion of the movement path. The lubricant drained from the emitter is distributed to the lubrication point. A distribution device may be positioned below the emitter to collect the lubricant drained from the emitter and to distribute the collected lubricant to a lubrication point or position other than a position below the emitter during the second portion of the movement path.

U.S. Pat. No. 4,063,617 provides an apparatus wherein a cable is passed through a lubricant filled chamber comprising an open housing and first and second flexible, annular discs each having radial slits along its inner circumference. A third flexible annular disc adjacent to said second disc includes radial slits on its inner circumference rotatably displaced from said second disc slits. The inner circumferences of the discs deformably engage the cable whereby lubricant beads are deposited at the second disc, which beads are uniformly spread by the deformably engaged sections of the third disc.

U.S. Pat. No. 5,107,961 provides a fixture facilitating the lubrication of cables including a housing having a clamping portion and a resilient insert to receive and capture the elongate cable and the end of the cable sheath, the compressible material being clamped around these portions. A valved lubricant aperture is provided in the fixture for introducing lubricant under pressure to the cable sheath while preventing blowback of the pressurized lubricant. The compressible insert in the fixture is designed to be captured in the base of one portion of the fixture and at another point in the moving portion of the fixture to allow it to be opened and closed for insertion and removal of the cable and sheath.

U.S. Pat. No. 4,422,529 teaches a method of lubricating steel cable wherein the steel cable is drawn through a chamber containing lubricant under pressure. The chamber has an outlet and an inlet lined with rubber sleeves through which the cable passes. A liquid lubricant is utilized, preferably a lubricating oil, which is supplied to the chamber by means of a pump having a high delivery pressure, minimum 20 bar and preferably above 40 bar, but with a relatively small delivery capacity. The rate of passage for the steel cable through the chamber is adapted such that the hollow spaces in the steel cable absorb the supplied oil to such an extent that oil leakage is avoided. The apparatus for carrying out the method comprises a chamber for lubricant under pressure, having an inlet and an outlet for the steel cable. A supply hose for lubricant leads to the chamber, and a pressure pump ensures pressure in the lubricant. The pump is a suction pump which can deliver a pressure of at least 20 bar, preferably above 40 bar, but has a small delivery capacity.

U.S. Pat. No. 4,336,866 is drawn to a wire rope lubricator cleaner for applying to a wire cable a lubricant cleaner, and removing from the wire cable excess lubricant cleaner so as to lubricate and clean the wire cable. A lubrication canister removably coupled to a rectangular shaped frame assembly applies the lubricant cleaner to the wire cable. A die rotatably mounted on an upper slide assembly of the rectangular shaped frame removes the excess lubricant from the cable and cleans the wire cable.

U.S. Pat. No. 3,951,235 is drawn to a greasing device for cables comprising at least one hollow body having walls defining an inner chamber adapted to be filled with a predetermined quantity of a lubricating material having a relatively high coefficient of viscosity, and a predetermined pressure. At least one pair of apertures are provided through said walls for a cable to be greased to extend therethrough and across said inner chamber so as to come into contact with said lubricating material inside said chamber; the size of said apertures being such that a predetermined clearance is present between the periphery of each aperture and the surface of the cable when the latter is mounted through the greasing device. A weighted member travels through the chamber housing, while acting on the grease therein, to force the grease toward the cable passing through the housing and toward the apertures in the housing through which the cable passes.

U.S. Pat. No. 4,498,558 teaches a lubricating device which is provided for greasing wire ropes and cables comprising a diametrically split housing with clamps to close the housing about the cable. Within the housing is a diametrically split core body of hard elastomeric material having an axial bore through which the cable travels axially. At the center of the core body is an internal cavity through which the cable passes and which is kept supplied with grease under pressure. Toward its ends the core body has two further internal cavities through which the cable passes, which serve to collect surplus grease. Between and beyond the grease supply and collection cavities, the axial bore of the core body is profiled so that each length of it has the form of an internal triangular section or Vee threaded screw thread; except that the directions of the screw thread are mutually reversed in the two halves of the split core body. The minimum diameter of the screw threads is substantially equal to the cable diameter so that sealing contact occurs between the cable and the thread peaks. At its ends, the housing is fitted with scraper plates having central holes, through which the cable passes, of substantially the same diameter as the cable.

What is lacking in the prior art is a cable treatment device for use in cleaning, lubricating or coating of a cable that is adapted to the follow the natural helix of the cable to provide high pressure treatment of a cleaner, lubricant or high viscosity inhibitor with minimal fluid loss by extending the life of the sealing mechanism and minimum wear to the cable.

SUMMARY OF THE INVENTION

Currently, low viscosity brush on inhibitors are used on cables with non-circular cross-sections and the high viscosity inhibitors can be applied to circular cross-section cables with a pressure applicator. The present invention provides a pressure applicator having a configuration and seal design which enables sufficient pressure generation to provide complete penetration of the lubricant within the section of cable being treated. The design provided by the instant invention not only functions with cables having a non-circular cross-section, but it also provides a superior sealing for treatment of circular cables.

This design provides a significant benefit by insuring application of a superior high viscosity inhibitor to all cables as long as physical space allows. The rotation capability reduces seal wear on the circular cross section cables by following the helix formed by the outer layer wire.

Accordingly, it is an objective of the instant invention to provide a rotary cable treatment assembly to coat a cable with either a pressurized lubricant or fluid rust inhibitor.

It is a further objective of the instant invention to provide a lubricator capable of applying sufficient pressure to impregnate the entirety of the cable's cross section.

It is yet another objective of the instant invention to provide a rotary cable lubricator having a seal structure adapted to follow the cable geometry while experiencing minimal wear and simultaneously retaining maximum pressure.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
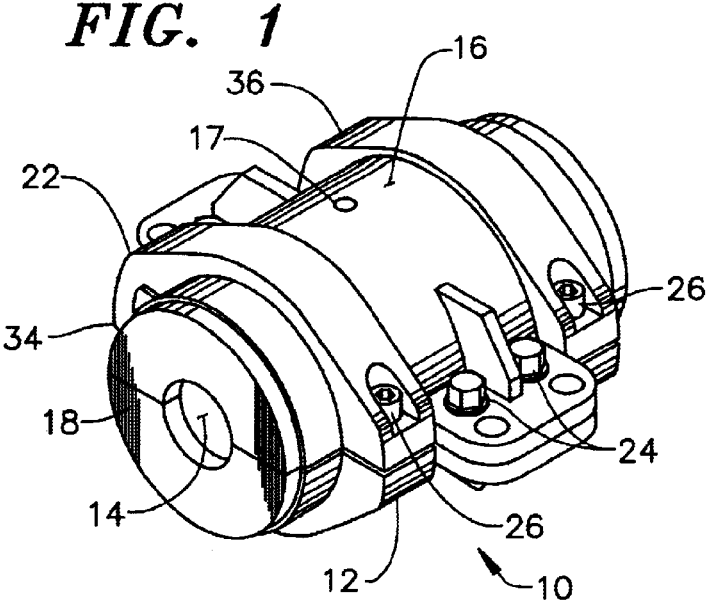
FIG. 1 is an isometric view of the cable treatment assembly device.
Figure 2:
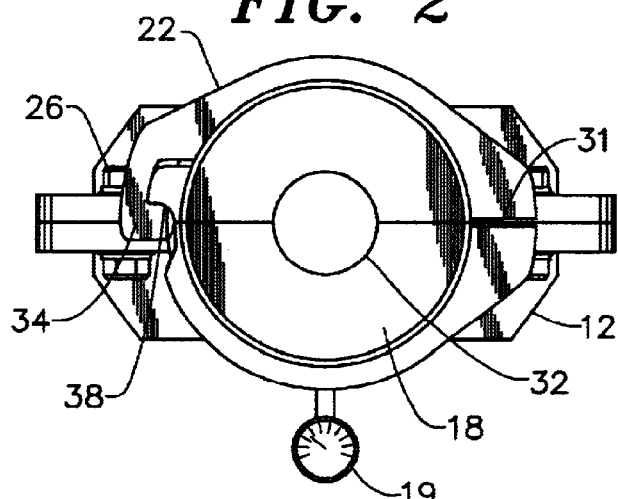
FIG. 2 is an end view of the assembly.

Now referring to FIGS. 1 and 2, set forth is a stator assembly 10 formed from a first generally semi-cylindrical shell 12 having an inner surface 14 and an outer surface 16 with a proximate endwall 18 located along a first end of the shell 12 and a distal endwall 20 located along a second end of the shell 12. A second generally semi-cylindrical shell 22 also includes an inner surface and outer surface with a proximal and distal endwall forming a mirror image of the inner surface and the endwalls 18, 20 of the first shell 12. The first shell 12 is securable to the second shell 22 by use of screw fasteners 24 and bolt fasteners 26. It should be noted that various fastening techniques may be used that are capable of maintaining the shells together when the cavity formed between the shells 12,22 is subjected to a pressure in excess of 3000 psi. Pressurize fluid may be injection through port 17 with a gauge 19 mounted, directly or indirectly, to the stator providing an accurate indication of cavity pressure. A gasket seal 31 is placed within gasket slot 30 to prevent fluid from escaping the shells.

The endwalls 18,20 of the first shell 12 and the mirror image endwalls of the second shell 22 cooperate to form an aperture 32 adapted to encircle a cable having a circular or non-circular cross section traveling axially through the stator 10. To allow the stator 10 to easily coupled to a cable, the second shell 22 can be hingedly attached by attachment arms 34 and 36 that engage a receptacle 38 formed in the first shell 12. The hinge design allows for a uniform clamping of the shells by aligning the shells during installation.

Figure 3:
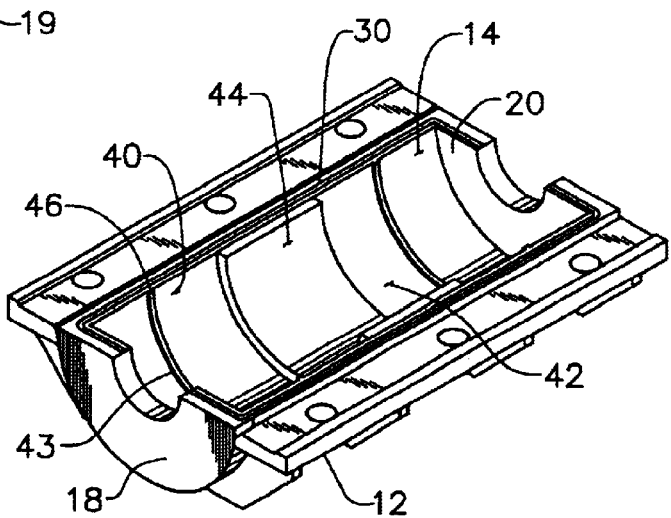
FIG. 3 is an isometric view of half the shell that forms the stator.

Referring to FIG. 3, the inner surface shells are formed to receive a rotor assembly. The inner surface 14 of shell 12 includes a preformed seal section 40 located along the proximal endwall 18 and a second seal section 42 located at along distal endwall 20. Between seal sections 40 and 42 is the injection cavity 42 that may include a spacer pipe 44 described later in this specification, that may be used between the seals. It should be noted that the seals may be considered the rotor assembly, without or with out a spacer pipe. Each seal section 40 and 42 of the rotor assembly includes a detent 57 that accepts a corresponding protrusion or tab 43 located on the outer surface of the seals that operate to maintain the seals in position and further inhibits passage of fluid around the seals. Alternatively, the rotor assembly may include a protrusion along an outer surface with the shell surface having a corresponding detent.

Figure 4:
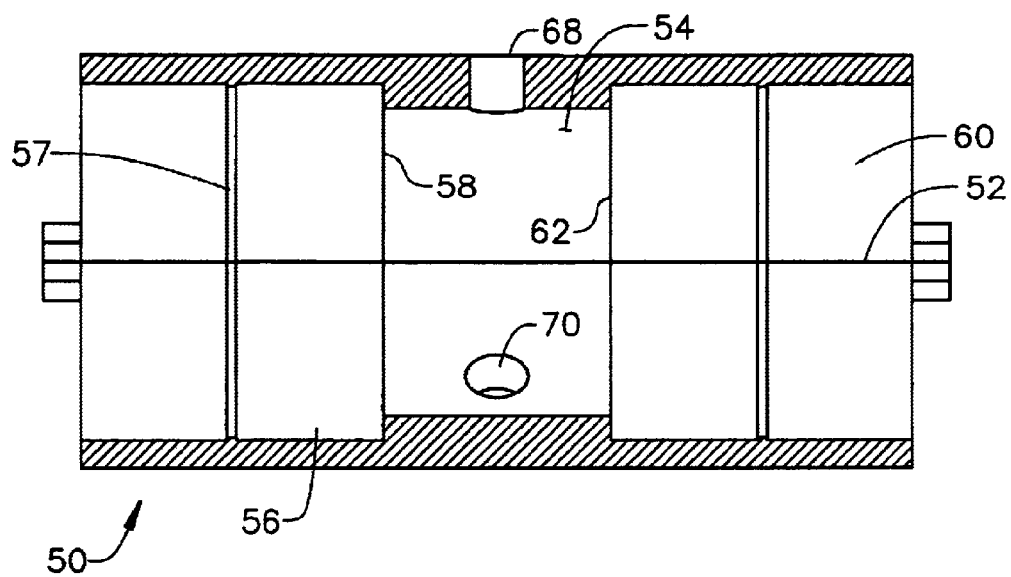
FIG. 4 is a perspective view of the rotor assembly.
Figure 5:
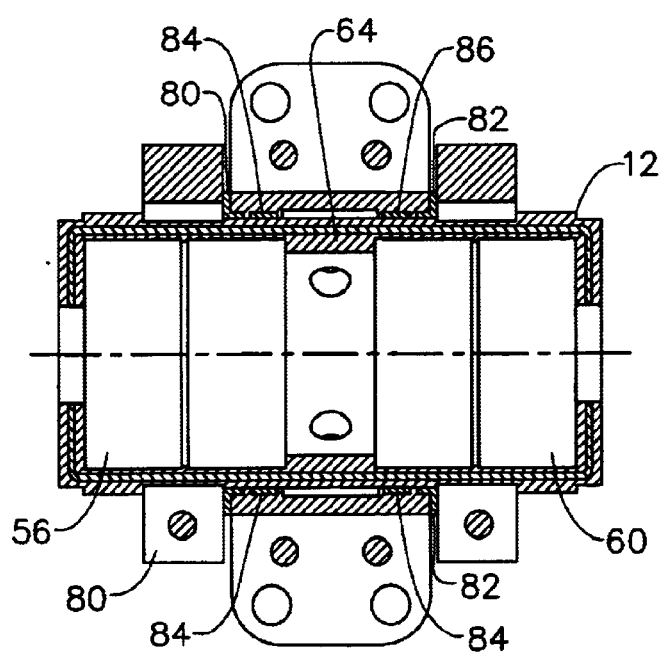
FIG. 5 is a perspective view of the rotor assembly placed with the stator.

FIG. 4 illustrates the rotor assembly 50 which is designed and arranged to fit around a cable traveling axially 52 through the rotor 50. The rotor 50 has a centrally located aperture 54 designed and arranged to fit around the cable and has a first luber seal 56 positioned at one end 58 of the cavity 52 and a second luber seal 60 positioned at the other end 62 of the cavity 54. The cavity 54 may be consist of a spacer pipe 64 to assist in maintaining the seals depending on the type of cable to be treated. Fluid injection port 68 accepts pressurized fluid into the cavity 54 wherein spacer pipe 64 may include a nozzle injector port 70 to delivery the fluid around the cable that is passed through the rotor assembly 50. As shown in FIG. 5, seals 58 and 60 have an outer surface conforming to the inner surface of the stator shell 12 and an inner surface 72 conforming to the outer surface of a cable. The luber seals 56 and 60, each are constructed from polyurethane or the like material that provides deformability at high pressure but remain highly resistant to wear. Unique to this invention is that wear patterns are repeatable in that the rotor assembly rotates according to the helix pattern of the cable being treated. For instance, if Warrington Seale type wire rope is to be treated, the cable may wear a pattern into the seal over a period of time. This wear pattern enhances the sealing ability of the luber seal by allowing the seal to conform to the wire strands that from the helix. Alternatively, the rotor assembly can be made of a non-deformable material such as 304 stainless steel wherein a hydraulic seal such as a polyurethane o-ring is positioned around the rotor structure to engage the sidewalls of the stator and to engage the cable passing through the inner rotor assembly aperture.

The rotor assembly is supported by bushings 80 and 82, and bearing 84 and 86. The assembly is designed to operate on fluid pressures of about 3000 psi wherein the fluid, whether it be a lubricant, a high viscosity rust inhibitor, a cleaning fluid or the like, impregnates the cable to effectively coat each individual wire strand.

The rotor assembly 50 can be sized to accommodate any size cable wherein the inner surface diameter of the rotor may accept a cable of a particular diameter yet continue to use the same stator housing. Thus, the cable may be ¼ inch or greater than 3 inches, requiring only replacement of the rotor assembly. The rotor can be formed from a single piece of material having a diametrically split with or without the spacer pipe positioned between each of the luber seals.

Figure 6:
FIG. 6 is a partial side view illustrating a non-circular cable.

Non-circular cables are those cables, such as the wire rope 90 illustrated in FIG. 6 having an outer surface that is not perfectly circular typically caused by a reinforcement stand of wires, or armor, that forms the outer most portion of the cable. For instance, non-circular cables may include those designs known as a 2-Operation wire rope, a Warrington with a 1×19 stand core, a Seale with a 7×7 IWRC, a Filler Wire with a fiber core, a Warrington Seal with a 7×7 IWRC; a Filler Wire with a 7×7 IWRC, and so forth.

The assembly 10 provides an effective method for treating a cable having a non-circular outer surface wherein a cable is first positioned through the stator assembly. Fluid is then injected into the stator assembly at a pressure sufficient to impregnate the cable with the fluid while the cable is drawn through the stator at a predetermined rate of passage that will cause said rotor assembly to rotate in accordance with a helix formed by wire strands along an outer surface of the cable and allow the fluid to impregnate the cable.

It is to be understood that while a certain form of the invention is illustrated, is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A rotary cable treatment assembly comprising:
    a stator formed from a first generally semi-cylindrical shell having an inner surface and an outer surface with a proximate endwall located along a first end of said shell and a distal endwall located along a second end of said shell, a second generally semi-cylindrical shell having an inner surface and outer surface having both proximal and distal endwalls forming a mirror image of said endwalls of said first shell, said first shell being securable to said second shell thereby defining a cavity therebetween with each said endwall cooperating to form an aperture adapted to encircle a cable traveling axially through said stator;
    a rotor assembly rotatably secured within said cavity, said rotor assembly having a centrally located aperture designed and arranged to fit around the cable traveling axially through said stator, said rotor assembly including a means for hydraulically sealing to said stator and to the cable;
    a high pressure fluid input port;
    wherein a cable is passed between the proximal and distal apertures of said stator and said rotor whereby the cable may be subjected to a high pressure fluid allowing fluid impregnation to cable strands with minimal fluid loss from said assembly wherein said first and second shell includes a sealing ring therebetween.

2. The rotary cable treatment assembly according to claim 1 wherein said first shell is hingedly coupled to said second shell and securable in a closed position by at least one fastener.

3. The rotary cable treatment assembly according to claim 1 wherein said means for hydraulically sealing is constructed from a deformable material that seals at high pressures including an outer surface conforming to the inner surface of said stator and an inner surface conforming to the outer surface of the cable.

4. The rotary cable treatment assembly according to claim 3 wherein said rotor assembly is diametrically split along its axis for ease of place around a cable.

5. The rotary cable treatment assembly according to claim 3 wherein said rotor assembly is maintained a predetermined distance from the inner surface of said stator by a bearing and rotating bushing.

6. The rotary cable treatment assembly according to claim 3 including a detent located around the circumference of each seal that comprises the rotor, said detent operatively associated with a tab located around the inner surface of said stator wherein said detent and tab operate to contain fluid from passing while under pressure.

7. The rotary cable treatment assembly according to claim 3 including a raised tab located around the circumference of each seal, said raised tab operatively associated with a detent located around the inner surface of said stator wherein said tab and detent operate to contain fluid from passing while under pressure.

8. The rotary cable treatment assembly according to claim 3 wherein each said seal includes an alignment means for positioning the rotor assembly to maintain a fluid injection cavity while maintaining a seal along each said endwall.

9. The rotary cable treatment assembly according to claim 1 wherein said first shell being securable to said second shell to withstand about 3000 psi.

10. The rotary cable treatment assembly according to claim 1 wherein said rotor assembly can be sized to have an inner surface diameter to accommodate a cable of any size diameter.

11. The rotary cable treatment assembly according to claim 1 including a means for measuring the amount of pressure in said cavity.

12. The rotary cable treatment assembly according to claim 1 wherein the cable has a non-circular cross section.

13. A rotary cable treatment assembly comprising:

a stator formed from a first generally semi-cylindrical shell having an inner surface and an outer surface with a proximate endwall located along a first end of said shell and a distal endwall located along a second end of said shell, a second generally semi-cylindrical shell having an inner surface and outer surface having both proximal and distal endwalls forming a mirror image of said endwalls of said first shell, said first shell being securable to said second shell thereby defining a cavity therebetween with each said endwall cooperating to form an aperture adapted to encircle a cable having a non-circular cross section traveling axially through said stator;

a rotor assembly rotatably secured within said cavity, said rotor assembly having a centrally located aperture designed and arranged to fit around the cable traveling axially through said stator, said rotor assembly including a means for hydraulically sealing to said stator and to the cable;

a high pressure fluid input port;

wherein a cable is passed between the proximal and distal apertures of said stator and said rotor whereby the cable may be subjected to a high pressure fluid allowing fluid impregnation to cable strands with minimal fluid loss from said assembly wherein said rotor can be formed from a single piece of material with said means for spacing said means for hydraulically sealing.

14. A rotary cable lubricant treatment assembly for use on cables having a non-circular cross section, said assembly comprising:

a stator formed from a first generally semi-cylindrical shell having an inner surface and an outer surface with a proximate endwall located along a first end of said shell and a distal endwall located along a second end of said shell, a second generally semi-cylindrical shell having an inner surface and outer surface having both proximal and distal endwalls forming a mirror image of said endwalls of said first shell, said first shell being securable to said second shell thereby defining a cavity therebetween with each said endwall cooperating to form an aperture adapted to encircle a cable having a non-circular cross section traveling axially through said stator, said first shell is hingedly coupled to said second shell and securable in a closed position by at least one fastener;

a rotor rotatably secured within said cavity, said rotor having a centrally located aperture designed and arranged to fit around the cable traveling axially through said stator, said stator including a tab located around the inner surface at a predetermined distance from said stator proximal and distal endwalls, said rotor including a first seal located between said proximal endwall and one end of said rotor, and a second seal located between said distal endwall and a second end of said rotor, each seal having an outer surface conforming to the inner surface of said stator and an inner surface conforming to the outer surface of the cable, each said seal having a detent located around the circumference of each seal;

a bearing and rotating bushing means for maintaining said rotor in a predetermined position from the inner surface of the stator;

a high pressure lubricant input port;

wherein a cable having a non-circular cross section is passed between the proximal and distal apertures of said stator and said rotor whereby the cable is subjected to said high pressure lubricant allowing lubricant attachment to cable strands with minimal lubricant loss from said assembly.

15. The assembly according to claim 14 wherein said fastener is further defined as coupling bolts positioned along an edge of said stator to provide sufficient clamping pressure for 3000 psi cavity pressures.

16. The assembly according to claim 14 wherein each said seal is diametrically split and deformable under high pressure to provide a seal between the seal and the cable, and between the seal and the stator.

17. The assembly according to claim 14 wherein said first and second shell includes a means for sealing said shells to withstand an internal lubricant pressure of about 3000 psi.

18. The assembly according to claim 14 wherein said means for hydraulic sealing can be sized to have an inner surface diameter to accommodate a cable of any size diameter.

19. The assembly according to claim 14 including a means for measuring the amount of pressure in said cavity.

20. The assembly according to claim 14 wherein said raised tab is located around the circumference of each seal and said detent is located around the inner surface of said stator wherein said tab and detent operate to contain fluid from passing while under pressure.

* * * * *